United States Patent [19]

Aldridge

[11] Patent Number: 4,721,528

[45] Date of Patent: Jan. 26, 1988

[54] LOCKING COMPOUND FOR LOCKING FASTENERS IN PLACE

[75] Inventor: Jimmy A. Aldridge, Inglewood, Calif.

[73] Assignee: Lockheed Corporation, Calabasas, Calif.

[21] Appl. No.: 27,912

[22] Filed: Mar. 19, 1987

Related U.S. Application Data

[63] Continuation-in-part of Ser. No. 878,543, Jun. 25, 1986.

[51] Int. Cl.$^4$ .......................... C04B 14/00; C09D 1/00
[52] U.S. Cl. ...................................... 106/84; 106/286.5
[58] Field of Search ...................... 106/286.5, 84, 38.3, 106/287.17

[56] References Cited

U.S. PATENT DOCUMENTS 3,069,277  12/1962  Teja ......................................... 106/74
3,873,334  3/1975  Lee et al. ........................ 106/287.12

OTHER PUBLICATIONS

Chem Abst., vol. 84: 110638f.

*Primary Examiner*—Theodore Morris
*Attorney, Agent, or Firm*—Louis L. Dachs

[57] ABSTRACT

The invention is a compound for locking a fastener in place after it has been torqued and also for providing an indication that it has remained properly torqued. The compound includes 72.5% to 77.5% by weight of a first mixture of substantially 18.3% $Al_2O_3$, 29.5% $Al_2SiO_3$ and 41.4% $Na_2SiO_3$ particles on a weight basis. Added to the first mixture is 1.3% to 1.7% by weight of a second mixture of substantially 80% $Al_2O_3$ fiber and 20% $SiO_2$ particles, all on a weight basis. A third constituent is 0.4% to 0.6% by weight of a third mixture of substantially 88% $Zr_2O_3$ and 12% $Y_2O_3$ powder. Finally, the fourth constitutent is 20% to 23% by weight $H_2O$. When used in an oxygen-rich environment, 0.2% to 0.4% by weight of an inorganic pigment of a green color is addded. When the constituents are mixed into a paste, the compound has a one-hour pot life and cures at room temperature in three to four hours. This time can be considerably decreased by raising the temperature. For example, the compound will cure in one to two minutes if heated to 600° to 625° F. by use of a heat gun.

4 Claims, No Drawings

LOCKING COMPOUND FOR LOCKING FASTENERS IN PLACE

This application is a cip of Ser. No. 878,543 filed 06/25/87, pending.

TECHNICAL FIELD

The invention relates to the field of systems for locking a torqued fastener in place and providing indication thereof and, particularly, to one suitable for use in an oxygen-rich environment.

BACKGROUND INFORMATION

There are many methods available for locking a previously torqued fastener in place and, thereafter, for indicating whether the fastener has been tampered with or come loose. One common method is to lockwire the fastener; but, lockwiring requires a hole in the fastener as well as in the adjacent structure for the lockwire. The use of a castellated nut and cotter pin also accomplishes this dual function. But, here again, a special nut, a hole through the fastener and, of course, a cotter pin are required. Furthermore, cotter pins are not usable on fluid couplings.

When self-locking fasteners are used, an indicator in the form of a dab of paint across the fastener and adjacent structure is used. Tampering or self-loosening is easy to spot because the paint will be broken at the line between the fastener and the adjacent structure, typically between the nut and washer or bolt head and washer. Unfortunately, most paints are made from organic compounds such as polyurethanes or epoxies. These cannot be used in oxygen-rich environments because a spark will easily ignite and burst them into flames. These paints also do not have the strength to act as a "clock".

Applicant has previously tested numerous commercially available ceramic cements but none have proven adequate. Only one ceramic material has proven usable (SERMETAL), but it becomes brittle and separates from plumbing fittings upon aging. This material has also proved to be difficult to use. Additionally, Applicant has developed a compound which is disclosed in co-pending Patent Application Ser. No. 812,500, "A Locking Compound for Locking Fasteners in Place", which solved the problems outlined above. However, it would be desirable to have a compound with increased pot life and decreased cure times.

Thus, it is a primary object of the present invention to provide a fastener locking compound which provides a visual indication that the fastener has remained properly torqued.

It is another primary object of the subject invention to provide a fastener locking compound which is usable in an oxygen-rich environment.

It is a further primary object of the subject invention to provide a fastener locking compound that provides good adhesion while not deteriorating with age.

It is still a further object of the subject invention to provide a fastener locking compound that is easy to prepare, has improved pot life and cure time, and is easy to apply.

DISCLOSURE OF THE INVENTION

The invention is a compound for locking a fastener in place after it has been torqued and also for providing an indication that it has remained properly torqued. The compound includes 72.5% to 77.5% by weight of a first mixture of substantially 18.3% $Al_2O_3$, 29.5% $Al_2SiO_3$ and 41.4% $Na_2SiO_3$ particles on a weight basis. Added to the first mixture is 1.3% to 1.7% by weight of a second mixture of substantially 80% $Al_2O_3$ fiber and 20% $SiO_2$ particles, all on a weight basis. A third constituent is 0.4% to 0.6% by weight of a third mixture of substantially 88% $Zr_2O_3$ and 12% $Y_2O_3$ powder. Finally, the fourth constituent is 20% to 23% by weight $H_2O$. When used in an oxygen-rich environment, 0.2% to 0.4% by weight of an inorganic pigment of a green color is added. When the constituents are mixed into a paste, the compound has a one-hour pot life and cures at room temperature in three to four hours. This time can be considerably decreased by raising the temperature. For example, the compound will cure in one to two minutes if heated to 600° to 625° F. by use of a heat gun.

The novel features which are believed to be characteristic of the invention, both as to its organization and method of operation, together with further objects and advantages thereof, will be better understood from the following description.

BEST MODE FOR CARRYING OUT THE INVENTION

The invention is a compound for locking a fastener in place after it has been torqued and also for providing an indication that it has remained properly torqued. The compound includes a first mixture of 72.5% to 77.5% by weight of substantially 18.3% $Al_2O_3$, 29.5% $Al_2SiO_3$ and 41.4% $Na_2SiO_3$ particles on a weight basis. A suitable, commercially available, first mixture is Dylon C-10 manufactured by Dylon Industries, Cleveland, Ohio. Added to the first mixture is 1.3% to 1.7% by weight of a second mixture of substantially 80% $Al_2O_3$ fiber and 20% $SiO_2$ particles, all on a weight basis. A suitable, commercially available, second mixture is thermal insulation (SALI) manufactured by Zircar Products, Inc., Florida, N.Y. A third constituent is 0.4% to 0.6% by weight of a mixture of substantially 88% $Zr_2O_3$ (zirconia powder) and 12% $Y_2O_3$ (yttria). A suitable third mixture is No. ZYP129 manufactured by Zircar Products, Inc, Florida, N.Y. The fourth constituent is 20% to 23% by weight $H_2O$, preferably deionized $H_2O$. The first, second, and third constituents should have a particle size of between 2.9 and 9.7 microns.

When the compounds are used in oxygen-rich environments, 0.2% to 0.4% by weight of an inorganic green pigment, having the same particle size, is added. A suitable inorganic green pigment is No. F5203 manufactured by Ferro Corporation, Culver City, Calif. Other pigments can be used to provide the color desired. If the above commercially available products are used, they must be ground, preferably ball-milled, to meet the particle tolerance range (i.e., pass through a 60 to 200 mesh screen).

The compounds are made by mixing the first, second, and third mixtures (and the pigment, if applicable) together and, thereafter, adding $H_2O$ to form a paste. Thus, it is normally stored in two parts. When the water is added, the compounds have a pot life of about one hour and can be applied by use of a small brush, spatula, or comparable instrument. The compounds typically cure in three to four hours at room temperature; but, the cure time can be reduced to less than a few minutes if a heat gun is used to raise the temperature to 600° to 625° F. Thus, the pot life is longer and cure time shorter than the 45 minutes and four to six hours, respectively, of the compound disclosed in Applicant's co-pending Patent Application Ser. No. 812,500.

TEST RESULTS

1. The compounds have been successfully applied to stainless steel, both bare and clad aluminum, and titanium. It has been approved for use on these metals on military aircraft.

2. The compounds have successfully passed compatibility tests per MIL-R-25410F for Oxygen Regulations, paragraphs 4.8.25 through 4.8.26 and has been certified for use in lox applications.

3. Samples of both compounds have been subjected to MIL-H-27601A and MIL-H-6083, Petroleum Base Hydraulic Fluids, JP4, JP8, and JP7 fuels for 72 hours, both at room temperature and 350° F. No degradation was observed after exposure.

4. The compounds have been applied to hydraulic lines and vibrated on a paint shaker for over an hour. No visible cracks were observed.

5. The typical physical properties of the first compound (A) are: (1) modules of rupture 800 psi; (2) compressive strength 3,500 psi; (3) tensile strength 400 psi, and (4) shear strength of 500 psi.

While the invention has been described with reference to particular embodiments, it should be understood that the embodiments are merely illustrative as there are numerous variations and modifications which may be made by those skilled in the art. Thus, the invention is to be construed as being limited only by the spirit and scope of the appended claims.

INDUSTRIAL APPLICABILITY

The invention has application on fastener assembled structures of every type other than plastic and, in particular, on structures exposed to oxygen-rich environments.

I claim:

1. A compound for locking a fastener in place and, thereafter, providing a visual indication that it has remained properly torqued comprising:
    72.5% to 77.5% by weight of a first mixture substantially comprising, on a weight basis, 18.3% $Al_2O_3$, 29.5% $Al_2SiO_3$ and 41.4% $Na_2SiO_3$;
    1.3% to 1.7% by weight of a second mixture of substantially, on a weight basis, 80% $Al_2O_3$ fiber and 20% $SiO_2$ particles;
    0.4% to 0.6% by weight of a third mixture of substantially 88% $Zr_2O_3$ and 12% $Y_2O_3$ on a weight basis; and
    20% to 23% by weight of $H_2O$.

2. The compound as set forth in claim 1 wherein the particle size of the first, second, and third mixtures are between 2.9 and 9.7 microns.

3. The compound as set forth in claim 2 further including 0.2% to 0.4% by weight inorganic pigment having a particle size of between 2.9 and 9.7 microns.

4. The compound as set forth in claim 3 werein said $H_2O$ is deionized.

* * * * *